(No Model.)  A. F. PRICE.  2 Sheets—Sheet 1.
BICYCLE GEARING.

No. 570,052.  Patented Oct. 27, 1896.

Witnesses:
J. M. Fowler Jr.
Alex. F. Stewart.

Inventor:
Abel F. Price,
by Church & Church
his Attorneys.

(No Model.) 2 Sheets—Sheet 2.

A. F. PRICE.
BICYCLE GEARING.

No. 570,052. Patented Oct. 27, 1896.

Witnesses:
J. M. Fowler Jr.

Inventor:
Abel F. Price,
by Church & Church
his Attorneys.

UNITED STATES PATENT OFFICE.

ABEL F. PRICE, OF THE UNITED STATES NAVY.

BICYCLE-GEARING.

SPECIFICATION forming part of Letters Patent No. 570,052, dated October 27, 1896.

Application filed January 2, 1896. Serial No. 574,067. (No model.)

*To all whom it may concern:*

Be it known that I, ABEL F. PRICE, of the United States Navy, located at the United States Navy Yard, Brooklyn, New York, have invented certain new and useful Improvements in Bicycle-Gearing; and I do hereby declare the following to be a full, clear, and exact description of the same, reference being had to the accompanying drawings, forming a part of this specification, and to the letters of reference marked thereon.

This invention relates to improvements in gearing designed more especially for use on bicycles or manually-propelled vehicles wherein it is desirable to have the crank-axle rotate at a somewhat slower speed than the driving-wheel; and the objects of the invention are to provide a simple, frictionless, compact, and strong gearing adapted to be applied to a bicycle and to occupy a position in proximity to the hub of the drive-wheel, thus overcoming the necessity of employing sprocket wheels or chains, as in the ordinary form of gearing.

The invention consists in certain novel details of construction and combinations and arrangements of parts, all as will be now described, and pointed out particularly in the appended claims.

Figure 1:
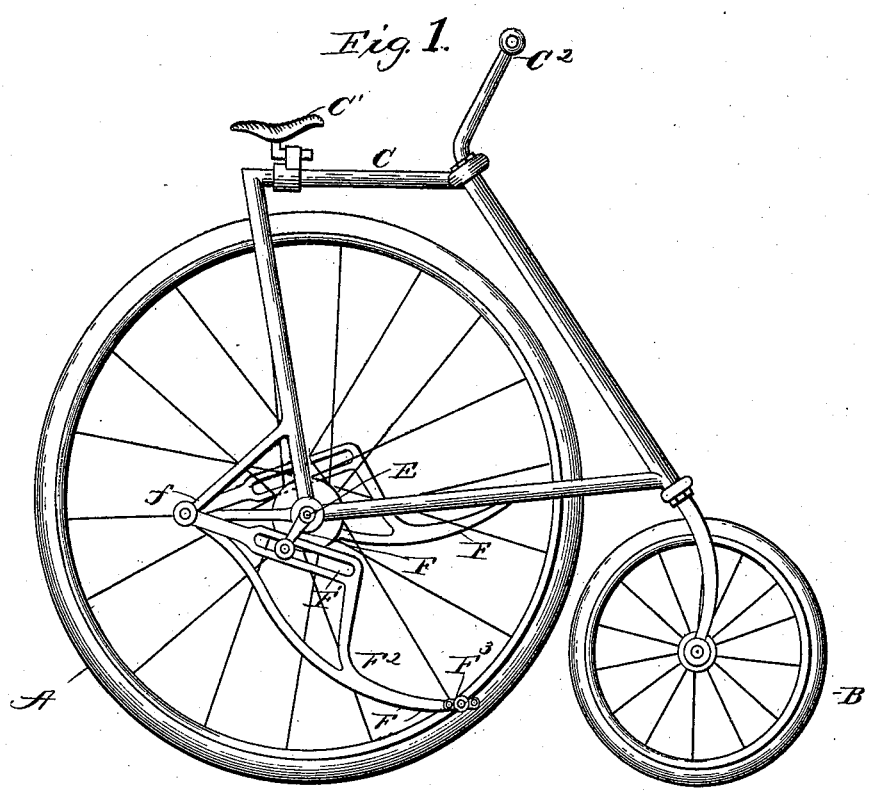
Figure 2:
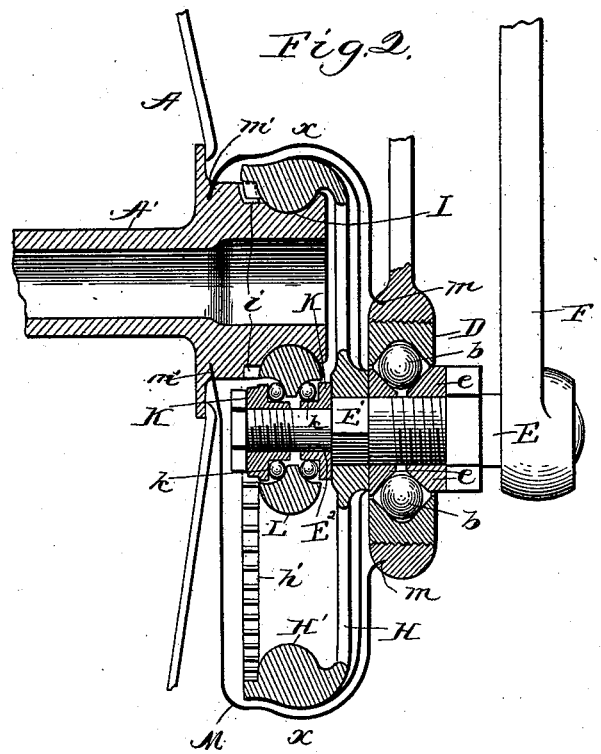
Figure 3:
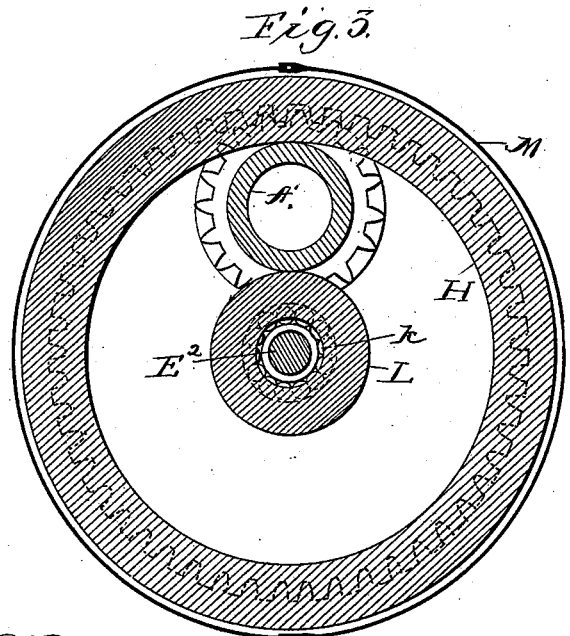

Referring to the accompanying drawings, Figure 1 is a side elevation of a bicycle having my invention applied thereto. Fig. 2 is a vertical section, partly in elevation, taken through one side of the hub of the drive-wheel and gearing for imparting a relatively high speed to said wheel. Fig. 3 is a section at right angles to Fig. 2 on the line $x\,x$.

Like letters of reference in the several figures indicate the same parts.

The particular form of bicycle to which this gearing is applied is quite immaterial, and as a matter of convenience I have illustrated it as applied to a bicycle having a drive-wheel A which is somewhat larger than the front or steering wheel B, the framing C, seat C', and handle-bars C² being of any usual or preferred construction.

The framing at a proper point in proximity to the center of the drive-wheel is provided with a box or bearing D, Fig. 2, which may be of the usual type to receive a circle of balls $b$ and to constitute the support for a relatively short crank-shaft E, provided on the outer end with a crank F, upon which the foot-lever bears and by means of which the crank-shaft is rotated in the ordinary manner. The crank-shaft E is held in its bearings against longitudinal movement by the cones $e$, which are adjustable to take up wear, and at a point immediately within the bearing said shaft is squared, as at E', and upon this squared portion is fitted the hub of a drive-disk H. Thus said driving-disk is caused to rotate in unison with the crank-shaft, and in order to impart such rotation to the driving-wheel, as well as to afford a supporting-bearing, said disk is provided with an internal inwardly-projecting annular bearing-face H', which coöperates and rests upon a circular bearing I, formed on the hub A' of the driving-wheel. These coöperating bearings H' and I are preferably smooth and are curved in cross-section, as illustrated in Fig. 2, to prevent their separation by a lateral movement, from which construction it will be apparent that if rotation is imparted to the driving-disk by means of the crank it will tend also to rotate the driving-wheel upon which it rests, and the bearing I being of less diameter than the bearing H' its speed of rotation will be correspondingly increased.

In order to provide against the possibility of any injurious slip between the driving-disk and hub-bearing I, I preferably provide a series of teeth $i$ on the hub-bearing at one side of the main or smooth bearing and a corresponding and coöperating series of teeth $h'$ on the driving-disk at one side of the main or smooth bearing H'. These teeth are preferably given so much clearance that they do not receive the strain under ordinary circumstances, but only insure the simultaneous rotation of the parts in case the vehicle should be subjected to injurious strains or be traveling over very rough roads.

To more effectually lock the parts and form a rigid stiff gearing, the crank-shaft is provided with an inward extension E², upon which is adjustably mounted a pair of bearings K, adapted to support a double row of balls $k$, which balls in turn carry a locking-annulus L, which annulus fits and coöperates with the hub-bearing I at a point diametrically opposite from the point of contact between said bearing I and the disk H. In other words, between the locking-annulus L and disk-bearing H' there is formed an annular space, (see Fig. 3,) in which space the hub-bearing I is retained.

The locking-annulus is free to rotate with the hub-bearing and consequently offers no frictional resistance to the rotation thereof, and, furthermore, by adjusting the annulus through the medium of the bearings K wear on the parts may be taken up and the disk set to insure the rotation of the hub and drive-wheel.

To prevent the entry of dust or dirt into the gearing, I preferably provide an inclosing casing M, made of light metal or celluloid in solid halves and with openings the edges of which fit into grooves $m\ m'$ in the hub of the drive-wheel and bearing D, as shown in Fig. 2. Thus the whole of the gearing is tightly inclosed. The point of union between the halves of the casing is formed by bifurcating the edges of one half and inserting the other edges within such bifurcations, thus not only forming a tight joint, but enabling the structure to be held in place by simply fastening the halves together by a locking-pin or otherwise, as found most convenient.

The levers $F^2$, it will be observed in Fig. 1, are pivoted at the rear ends to rearward extensions $f$ of the frame, and in order to afford clearance for the feet of the rider, as well as to permit of the levers being arranged in a central line with the point of application of the power, said levers are provided with a straight slot $F'$, in which the cranks work, said slot and crank being in line with each other when the crank is horizontal or in any desired position near the horizontal, thus giving the lever an equal throw above and below the center, and by using a lever pivoted close to the crank some advantage is secured by enabling the power to be applied throughout the greater arc of the circle. At the forward end the levers are dropped, preferably, with a sweeping curve, as at $F^2$, so as to afford room for the rider's foot. This construction gives a lever in which the bearing-surface for the crank is set at an angle to a line drawn between the fulcrum of the lever and pedal or foot-piece $F^3$.

The whole structure, it will be seen, is simple, embracing no parts liable to be broken or thrown out of operation by rough usage and at the same time the wheel may be speeded up to any desired speed or the speed changed by varying the size of the driving-disk and locking-annulus, which parts are inexpensive and may be quickly and easily substituted.

I have described, specifically, the device as applied to one side only of the driving-wheel, but it will be understood that in a bicycle a gearing such as described is arranged on each side of the wheel and operates independently thereon. So, too, while I have described the part H as a driving-disk, it will be understood that it may be provided with spokes or be in the form of a wheel, the term "driving-disk" being employed simply to prevent confusion of terms in describing the structure.

Having thus described my invention, what I claim as new is—

1. The combination with the drive-wheel having the hub-bearing thereon, of the crank-shaft, the driving-disk rotating with said crank-shaft and having the internal bearing coöperating with the bearing on the hub of the driving-wheel and the locking-annulus; substantially as described.

2. The combination with the drive-wheel having the hub-bearing thereon, of the crank-shaft, the driving-disk rotating with said crank-shaft and having the internal bearing coöperating with the bearing on the hub of the driving-wheel and the lock carried by the crank-shaft, said lock and hub having coöperating recesses and projections for preventing the separation of the parts, substantially as described.

3. In a bicycle-gearing the combination with the crank-shaft, the driving-disk mounted thereon and having the internal annular bearing, of the hub having the bearing coöperating with the driving-disk bearing and the locking-annulus journaled on the inner end of the crank-shaft and coöperating with the bearing on the hub the coöperating bearings on the disk, hub and annulus having recesses and projections respectively, whereby they are prevented from separating; substantially as described.

4. In a bicycle-gearing, the combination with the crank-shaft, the driving-disk mounted thereon and having the internal relatively smooth annular bearing convex in cross-section, of the driving-wheel hub having the annular concave end bearing and the locking-annulus journaled on the inner end of the crank-shaft and coöperating with said annular hub-bearing; substantially as described.

5. In a bicycle-gearing the combination with the crank-shaft the driving-disk journaled thereon and having the internal relatively smooth annular bearing with gear-teeth at one side of said bearing, of the driving-wheel hub having the relatively smooth bearing for coöperation with the smooth bearing on the disk and gear-teeth for coöperation with the gear-teeth on the disk and the locking-annulus for holding said bearings in engagement; substantially as described.

ABEL F. PRICE.

Witnesses:
L. G. BILLINGS,
PHILIP T. ROACHE.